United States Patent
McCann et al.

(10) Patent No.: US 6,885,872 B2
(45) Date of Patent: Apr. 26, 2005

(54) METHODS AND SYSTEMS FOR PROVIDING SHORT MESSAGE GATEWAY FUNCTIONALITY IN A TELECOMMUNICATIONS NETWORK

(75) Inventors: Thomas M. McCann, Cary, NC (US); Raghavendra G. Rao, Cary, NC (US); Richard E. Schaedler, New Hill, NC (US); Apirux Bantukul, Cary, NC (US); Peter J. Marsico, Chapel Hill, NC (US)

(73) Assignee: Tekelec, Calabasas, CA (US)

( * ) Notice: Subject to any disclaimer, the term of this patent is extended or adjusted under 35 U.S.C. 154(b) by 0 days.

(21) Appl. No.: 10/842,394

(22) Filed: May 10, 2004

(65) Prior Publication Data

US 2005/0003838 A1 Jan. 6, 2005

Related U.S. Application Data

(60) Provisional application No. 60/469,254, filed on May 9, 2003.

(51) Int. Cl.$^7$ ................................................ H04Q 7/20
(52) U.S. Cl. .................... 455/466; 455/414.4; 455/445; 455/432.2; 455/422.1; 370/522; 370/466; 370/400; 370/401; 379/221.13; 379/221.08; 379/221.09; 379/221.1
(58) Field of Search .............................. 455/466, 414.4, 455/445, 432.2, 422; 370/522, 466, 400, 401; 379/221.13, 221.08, 221.09, 221.1

(56) References Cited

U.S. PATENT DOCUMENTS

| | | | |
|---|---|---|---|
| 6,463,055 B1 | 10/2002 | Lupien et al. | |
| 6,560,456 B1 * | 5/2003 | Lohtia et al. | ............... 455/445 |
| 6,611,516 B1 | 8/2003 | Pirkola et al. | |
| 6,731,926 B1 * | 5/2004 | Link et al. | ............... 455/412.2 |
| 2002/0173320 A1 | 11/2002 | Aitken et al. | |
| 2003/0054844 A1 * | 3/2003 | Anvekar et al. | ............ 455/466 |
| 2003/0193967 A1 * | 10/2003 | Fenton et al. | ............... 370/490 |
| 2004/0142707 A1 * | 7/2004 | Midkiff et al. | .............. 455/466 |
| 2004/0198351 A1 * | 10/2004 | Knotts | ..................... 455/432.1 |

* cited by examiner

Primary Examiner—William Trost
Assistant Examiner—Danh C Le
(74) Attorney, Agent, or Firm—Jenkins, Wilson & Taylor, P.A.

(57) ABSTRACT

A short message gateway may include signal transfer point (STP) functionality, mobile originating short message service center (SMSC) functionality, and short message delivery point-to-point (SMPP) gateway functionality. The short message gateway may receive an SS7 message including a short message payload. The short message gateway may formulate an SMPP message including the short message payload and access one or more internal address resolution and/or number portability databases to determine the destination address for the SMPP message. The short message gateway may then forward the SMPP message to its destination.

42 Claims, 12 Drawing Sheets

US 6,885,872 B2

METHODS AND SYSTEMS FOR PROVIDING SHORT MESSAGE GATEWAY FUNCTIONALITY IN A TELECOMMUNICATIONS NETWORK

RELATED APPLICATIONS

This application claims the benefit of U.S. Provisional Patent Application Ser. No. 60/469,254, filed May 9, 2003; the disclosure of which is incorporated herein by reference in its entirety.

TECHNICAL FIELD

The present invention relates to methods and systems for communicating short message service (SMS) messages between signaling system 7 (SS7) network entities and short message point-to-point (SMPP) network entities. More particularly, the present invention relates to a short message gateway (SMG) node that receives, translates and routes SMS payloads between SS7 and SMPP network entities.

BACKGROUND ART

Short message service, when first introduced over a decade ago, enabled mobile subscribers to easily send and receive text messages via a wireless handset. As the convergence of wireless communication networks and Internet data networks has increased, the sending and receiving of SMS messages via computer terminals has become commonplace. Although specifications and industry standards related to SMS are constantly evolving and being modified, SMS messages have traditionally been used to convey text information, where the text may include any combination of alphanumeric characters. After the initial text messaging application, service providers began focusing on using SMS as a means of eliminating alphanumeric pagers by permitting two-way general purpose messaging and notification services. One service that has been provided using SMS is voice mail notification service. As technology and networks continued to mature, a variety of services were introduced, including electronic mail (email) and fax integration, paging integration, interactive banking, and information services, such as stock quotes, news highlights, etc.

SMS delivery service provides a mechanism for transmitting short messages to and from SMS-capable telecommunications terminals (e.g., mobile telephone handsets) via the signaling component of a wireless telecommunications network, as well as from other types of communications terminals (e.g., personal computers, personal digital assistants, network appliances, etc.) via a data network.

FIG. 1 is a network diagram illustrating a conventional mobile originated (MO) short message signaling scenario. In FIG. 1, a communications network environment 100 includes an originating wireless handset 102, an originating mobile switching center (MSC) 104, an SS7 signal transfer point (STP) 106, an originating short message service center (SMSC) 108 associated with the originating wireless handset 102, an SMPP gateway entity 110, an NPA-NXX database 112, a location routing number (LRN) database 114, a local number portability (LNP) database 116, a terminating SMSC 118, a home location register (HLR) node 120, and a terminating wireless handset 122.

As indicated in FIG. 1, originating wireless handset 102 transmits an SMS message to serving or originating MSC 104. MSC 104 transmits a mobile originated forward short message (MO_ForwardSM) to STP 106. At STP 106, the message may be message transfer part (MTP) routed or global title (GT) translated and then MTP routed to originating SMSC 108. SMSC 108 translates or converts the MO_ForwardSM message into an equivalent SMPP Submit_SM message and transmits the Submit_SM message to SMPP Gateway entity 110 via an Internet protocol connection. If the intended recipient of the SMS message is a mobile telephone service subscriber (as is the case in this example), SMPP gateway entity 110 may be required to query NP database 116. If the intended SMS message recipient has been ported, NP database 116 may return an LRN associated with the HLR serving the intended message recipient.

In this example, the LRN returned to SMPP gateway entity 110 identifies HLR 120. SMPP gateway entity 110 accesses LRN directory database 114 using the LRN value returned by LNP database 116 in order to determine the next routing address that is to be used in the SMS message delivery sequence. In this example, LRN directory database 114 returns a routing address associated with terminating SMSC 118 (i.e., the SMSC serving the intended message recipient.). If the connection between SMPP gateway entity 110 and terminating SMSC 118 is an IP connection, the routing address returned by LRN directory database 114 may be an IP address. If the connection between SMPP gateway entity 110 and terminating SMSC 118 is an SS7 MTP link, the routing address returned by LRN directory database 114 may be an SS7 point code.

In any event, the Submit_SM message is transmitted by SMPP gateway entity 110 to terminating SMSC 118. Upon receiving the message, terminating SMSC 118 queries HLR 120 in order to determine the current status and location of the intended message recipient. If the intended recipient is available, HLR 120 responds to SMSC 118 with information that identifies the MSC currently serving the recipient subscriber. In this case, the serving MSC is MSC 104. SMSC 118 translates or converts the SMPP Submit_SM message into an equivalent MT_ForwardSM message and transmits the MT_ForwardSM message to MSC 104. MSC 104 delivers the SMS message to the intended recipient.

The example described above with respect to FIG. 1 is merely illustrative of a basic SMS delivery scenario. Other messaging, such as delivery confirmation messaging, not described above may also take place during an SMS transaction. An SMPP gateway entity may also provide connectivity to communications networks other than mobile telecommunication networks, thereby enabling an SMS message originated by a mobile telephone to be delivered to an SMS terminal, such as a PC or a PDA, that is not directly connected to a mobile telecommunications network As described above, numerous routing address and message translation operations are typically required to support SMS message delivery service in a diverse communications network environment. Current network implementations, such as that shown in FIG. 1, require a number of different network elements that must be individually administered and effectively interoperated in order for SMS message delivery to be accomplished. The operating and administrative costs as well as the interoperability requirements may present a significant burden to network operators wishing to provide seamless SMS delivery service to subscribers. Accordingly, there exists a long-felt need for improved methods and systems for communicating SMS messages between SS7 network entities and SMPP network entities.

DISCLOSURE OF THE INVENTION

According to one aspect, the present invention includes a short message gateway (SMG) node that converts SS7-based SMS messages received from an SS7 network to SMPP messages and determines destination addresses for the SMPP messages. From an SS7 mobile originated SMS perspective, an SMG node may accept both Global System for Mobile communications (GSM) mobile application part (MAP) Forward-SM messages and American National Standards Institute (ANSI) Interim Standard 41 (IS-41) MAP SMDPP-Request messages from an originating MSC. Once an SMS message is received by the SMG, the SMG performs an address resolution procedure based on a destination mobile address associated with the received SMS message. The address resolution procedure determines the destination IP address of an external SMPP entity. Due to number pooling and mobile number portability, address resolution may include accessing multiple databases, such as a number portability (NP) database, a location routing number (LRN) database, and a directory number (DN) database, in order to obtain an IP address associated with a destination SMPP entity. In one exemplary implementation, all of these databases are located within the SMG node. Once a destination IP address has been determined, an SMPP Submit_Sm protocol data unit (PDU) is formulated and forwarded to the destination SMPP entity via an IP network.

According to another aspect of the invention, an SMG node may provide SMS routing functionality for SMPP messages received from an SMPP entity. For example, an SMPP gateway entity may forward an SMPP Submit_Sm message to an SMG, which performs routing resolution and forwards the SMPP Submit_Sm to the appropriate destination. The destination may be a terminating SMSC or other SMPP entity. This SMG capability enables the deployment of a wide range of SMS-based applications, such as intra- and inter-network SMS transfer applications and SMS push/pull services between mobile subscribers and an Internet service provider (ISP) or application service provider (ASP) residing in the public Internet.

Accordingly, it is an object of the present invention to provide a short message gateway node for communicating SMS messages between entities in an SS7 network and entities in an SMPP network.

It is another object of the present invention to provide an SS7 MAP SMS-SMPP gateway that performs number portability translations.

It is another object of the present invention to provide a short message gateway node including some or all of the databases necessary to determine the correct destination SMPP address for an SMPP message carrying a short message payload.

It is another object of the present invention to provide a short message gateway node that communicates with both SMPP gateway entities and SMSC entities via an SMPP interface.

It is another object of the invention to provide an STP with mobile originating SMSC functionality, SMPP gateway functionality, and SMPP address resolution functionality.

Some of the objects of the invention having been stated hereinabove, other objects will be evident as the description proceeds, when taken in connection with the accompanying drawings as best described hereinbelow.

BRIEF DESCRIPTION OF THE DRAWINGS

A description of preferred embodiments of the present invention will now proceed with reference to the accompanying drawings of which.

DETAILED DESCRIPTION OF THE INVENTION

Figure 2:
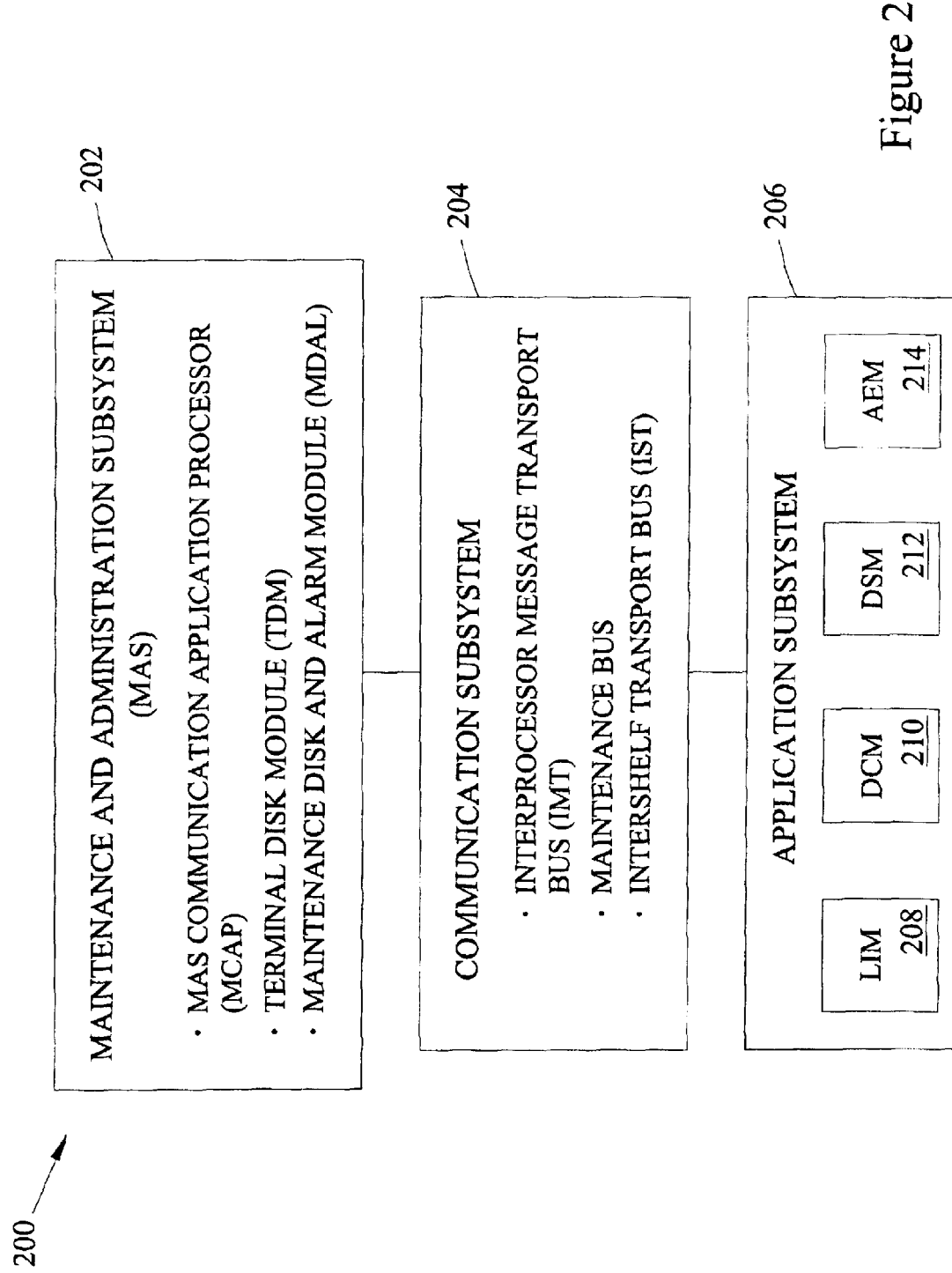
FIG. 2 is a block diagram illustrating an exemplary architecture of a signal transfer point suitable for use with embodiments of the present invention.

A short message gateway node according to an embodiment of the present invention may include an underlying hardware platform that performs functions similar to that of a traditional telecommunications network packet routing node, such as an SS7/IP-capable signaling gateway (SG) routing node. For example, the underlying hardware platform of a short message gateway may include an Eagle® STP or an IP[7] Secure Gateway® commercially available from Tekelec of Calabasas, Calif. FIG. 2 is a block diagram of hardware platform suitable for use with embodiments of a short message gateway of the present invention. The platform illustrated in FIG. 2 includes subsystem and modules common to the Eagle® STP and IP[7®] platforms as well as new modules for performing SMG functions of the present invention.

In FIG. 2, SMG node 200 includes the following subsystems: a maintenance and administration subsystem (MAS) 202, a communication subsystem 204, and an application subsystem 206. MAS 202 provides maintenance communications, initial program load, peripheral services, alarm processing and system disks. Communication subsystem 204 includes an inter-processor message transport (IMT) bus that is the main communication bus among all subsystems contained on a common shelf and an inter-shelf message transport (IST) bus that is the main communication bus between individual shelves of routing node 200. An IMT bus may include two 125 Mbps counter-rotating serial buses, while an IST bus may include two 1 Gbps counter-rotating serial buses.

Application subsystem 206 includes application cards or printed circuit boards capable of communicating with the other cards through the IMT and IST buses. Numerous types of application cards can be incorporated into SMG node 200. In FIG. 2, these application cards include a link interface module (LIM) 208 that provides SS7 links and X.25 links and a data communications module (DCM) 210 that provides a signaling-over-IP interface using transmission control protocol (TCP), user datagram protocol (UDP) or the stream control transmission protocol (SCTP). DCM 210 may support SS7 adaptation layer protocols, such as M3UA, M2UA, M2PA, SUA, and transport adapter layer interface (TALI), as described in the correspondingly-named IETF RFCs and Internet Drafts. A DCM may also support non-SS7 signaling protocols, such as session initiation protocol (SIP), H.225, and SMPP.

Application subsystem 206 may also include a database services module (DSM) 212 and an application engine module (AEM) 214. DSM 212 may provide number portability, global title translation, and other database services. Application engine module 214 may include hardware and software for supporting any number of signaling message processing applications. For example, application engine module 214 may support a short message gateway for interfacing between SS7 SMS network elements and SMPP network elements.

Each of the application cards or modules illustrated in FIG. 2 may be implemented via a printed circuit board with an application processor and a communications processor mounted thereon. The application processor may be programmed to perform signal processing functions, such as message routing, protocol translation, and short message gateway functions, as described herein. The communications processor on each application card may control communications over the interprocessor message transport bus. In an alternate embodiment, the application cards or processing modules illustrated in FIG. 2 may be implemented on general purpose computing platforms coupled to gateway 200 via external communications links, such as IP communications links.

Short Message Gateway Node Architecture

Figure 3:
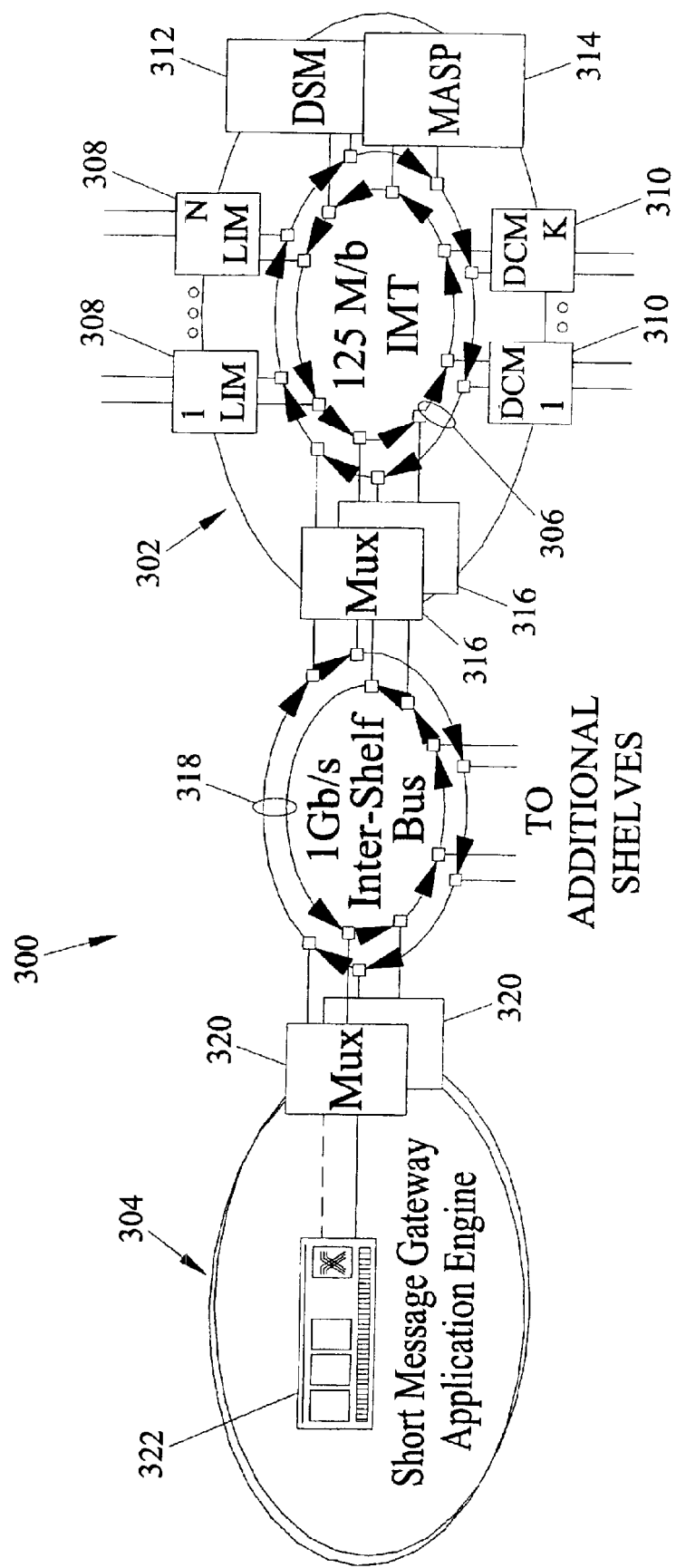
FIG. 3 is a block diagram illustrating an exemplary hardware architecture for a short message gateway node according to an embodiment of the present invention.
Figure 4:
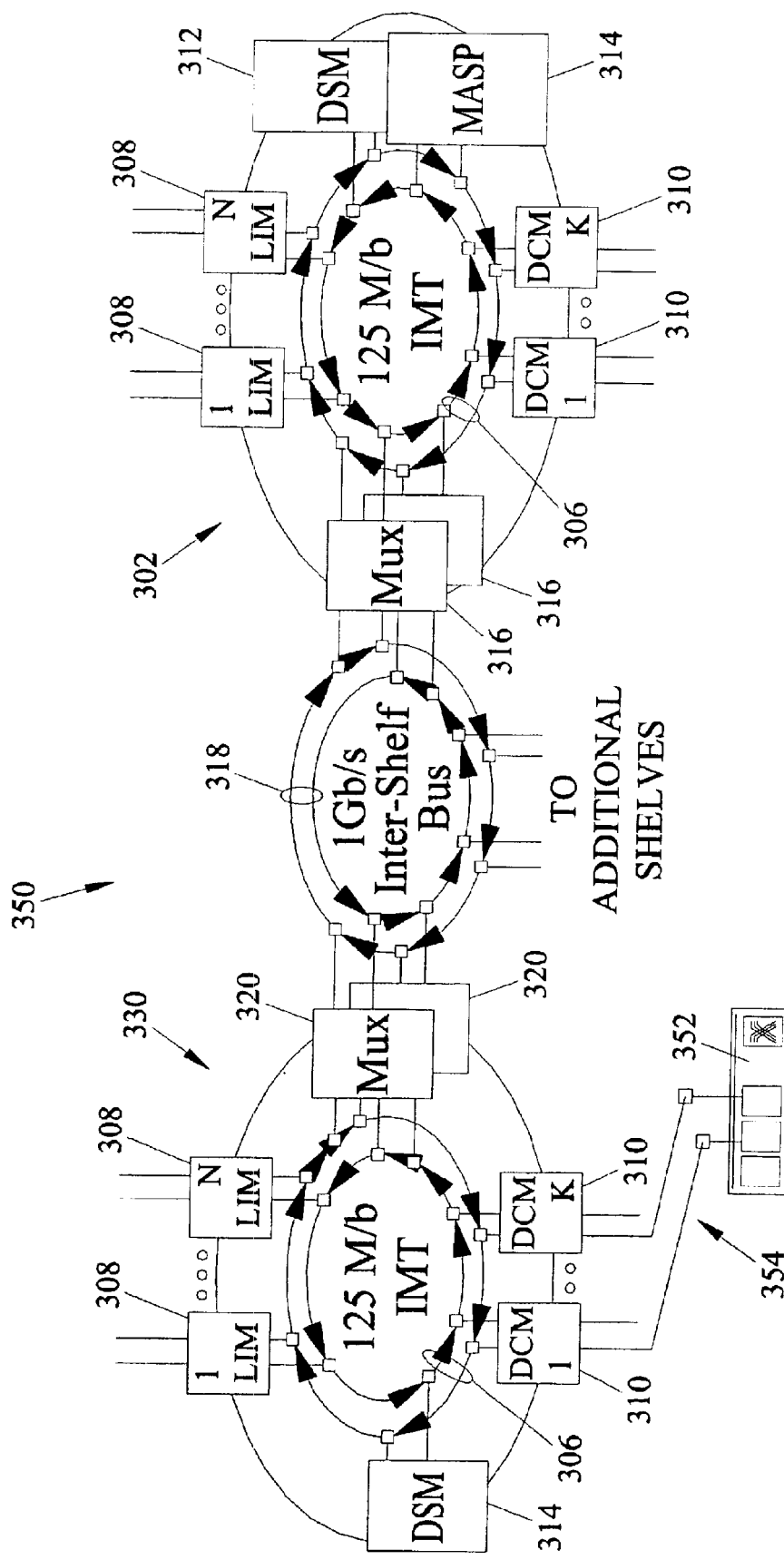
FIG. 4 is block diagram illustrating an exemplary hardware architecture for a short message gateway node according to an alternate embodiment of the present invention.

FIGS. 3 and 4 illustrate two exemplary system architectures for an SMG node according to an embodiment of the present invention. The primary difference between the two system architectures involves the method by which the SMS gateway application engine is coupled to the internal bus or buses of the routing node platform. In the telecommunications industry, large scale packet switching/processing platforms may be housed in telecommunications industry standard compliant frame or rack structures that include one or more component shelves. A single packet switching/processing platform may be made of multiple frame assemblies, each having multiple shelves. The system architecture illustrated in FIG. 3 is an exemplary SMG node 300 that may be housed in a telecommunications grade frame assembly, which includes two component shelves, shelf 302 and shelf 304. Shelf 302 includes an intra-shelf IMT bus 306 that facilitates communication between the modules residing in that shelf. More particularly, shelf 302 includes multiple SS7 link interface modules 308, multiple IP capable data communication modules 310, and a database services module 312 connected to IMT bus 306. A maintenance and subsystem processor module 314 is also connected to IMT bus 306 to provide maintenance communications, initial program load, peripheral services, alarm processing and system disks.

Shelf 302 includes first multiplexing modules 316 that transmit and receive messages between IMT bus 306 and an inter-shelf IST communication bus 318. In one embodiment, IST bus 318 is designed to have a larger bandwidth than IMT bus 306. In any event, IST bus 318 is in turn coupled to shelf 304 via second multiplexing modules 320. In the embodiment illustrated in FIG. 3, a high-performance application engine module 322 is coupled to multiplexing modules 320. In this example, application engine module 322 may be a general-purpose computing platform suitable for use in telephony signaling applications. An example of such a platform suitable for use with embodiments of the present invention is the TekServer application platform available from Tekelec of Calabasas, Calif. Application engine module 322 hosts a short message gateway application, which communicates with other communications and processing modules in the system via multiplexer modules 316 and 320 and communications buses 306 and 318.

FIG. 4 illustrates an SMG node according to an alternate embodiment of the present invention. In FIG. 4, SMG node 350 includes two component shelves, shelf 302 and shelf 330. As in the previously described embodiment, shelf 302 includes an intra-shelf IMT bus 306 that facilitates communication between the modules residing in that shelf. Shelf 302 also includes multiple SS7 link interface modules 308, multiple IP capable data communication modules 310, a database services module 312, and a maintenance and subsystem processor module 314 connect via bus 306. A first multiplexing module 316 in shelf 302 transmits and receives messages between IMT bus 306 and an inter-shelf IST communication bus 318. IST bus 318 is coupled to shelf 330 via a second multiplexing module 316.

As with shelf 302, shelf 330 also includes an intra-shelf IMT communication bus 306, to which second multiplexing module 316 is connected. In the embodiment illustrated in FIG. 4, a high-performance application engine module 352 is coupled to internal IMT bus 306 via one or more IP connections 354 to DCM communication modules 310. In an alternate embodiment, an application engine module may be coupled to an internal system bus via asynchronous transfer mode (ATM) or high-speed optical communications links, such as OC-n communications links. Once again, application engine module 352 may host a short message gateway application, which communicates with other communications modules, such as LIMs 308 and DCMs 310, and processing modules, such as DSM 312, in the system 350 via the multiplexer modules 316 and communications buses 306 and 318.

SMG Node Internal Operation

In the exemplary signaling scenarios described herein, SS7 signaling messages are transmitted and received by an SMG node via SS7 LIM modules. As described above, SS7 LIMs may route SS7 signaling messages, such as ISUP, SCCP, TCAP, and MAP messages, that are communicated using the message transfer part (MTP) protocol. However, other types of SS7-based signaling messages, such as TALI, M3UA, M2UA, M2PA, or SUA messages that are communicated using different protocols, such as TCP/IP, UDP/IP, SCTP/IP, or ATM, may be received and transmitted by an SMG node via a DCM. Furthermore, non-SS7 signaling messages, such as SMPP messages may be transmitted and received via an appropriately configured DCM.

Figure 5:
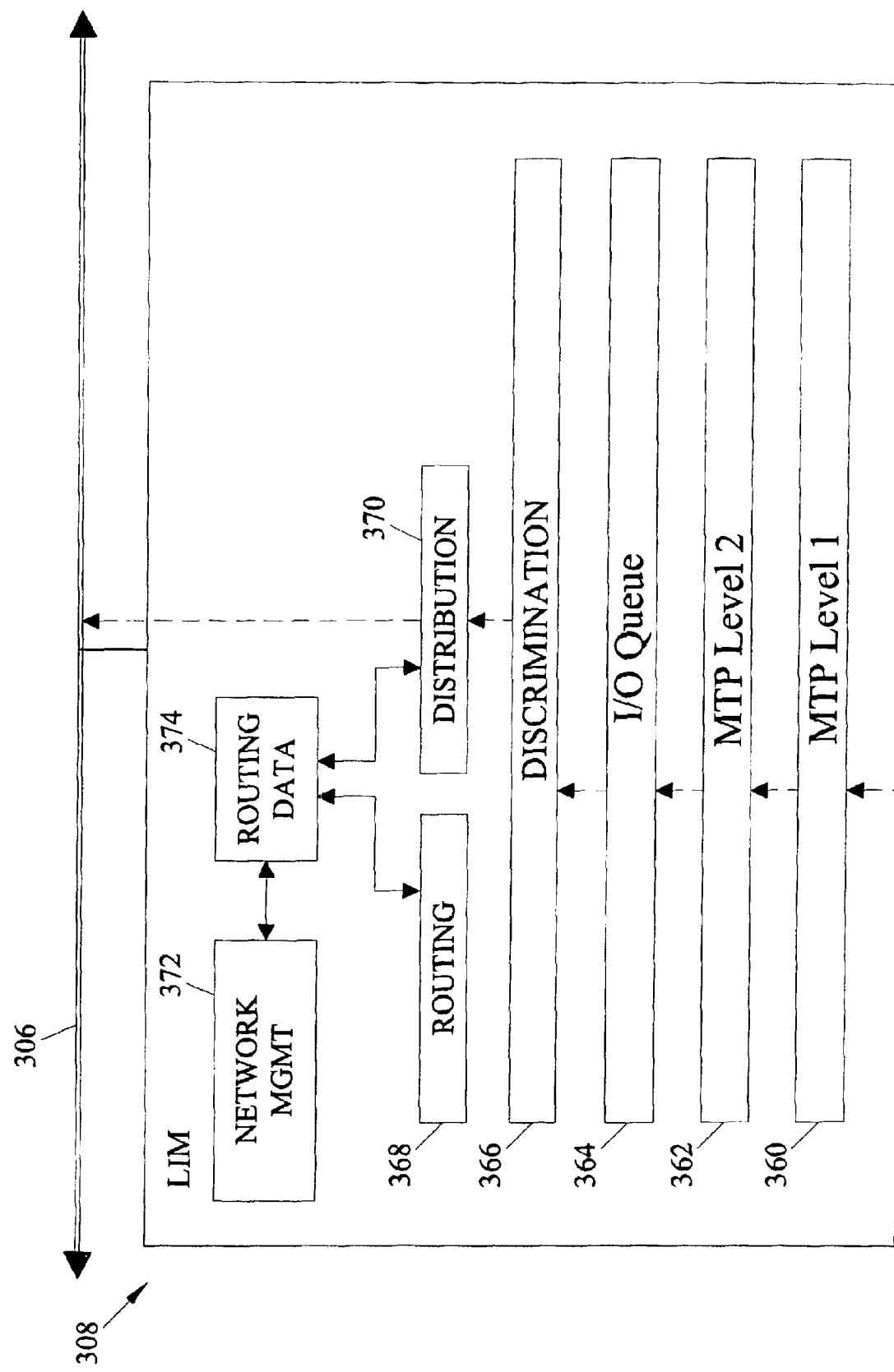
FIG. 5 is a block diagram of a signaling system 7 link interface module (LIM) suitable for use in a short message gateway node according to an embodiment of the present invention.

FIG. 5 is a block diagram of an SS7 LIM card 308 suitable for use in an SMG node according to an embodiment of the present invention. In the illustrated example, LIM 308 may include an SS7 MTP level 1 function 360, an MTP level 2 function 362, an I/O buffer 364, an MTP level 3 discrimination function 366, a message distribution function 368, a message routing function 370, and an SS7 network management function 372. A network routing data structure 374 may be used by functions 368 and 370 to route and distribute messages. MTP level 1 and 2 functions 360 and 362 provide the facilities necessary to send and receive digital data over a particular physical medium, such as a DS0 communication link. In addition, MTP level 1 and 2 functions 360 and 362 may provide error detection, error correction, and sequenced delivery of SS7 message packets. I/O buffer 364 provides for temporary buffering of incoming and outgoing signaling message packets. Message discrimination function 366 examines received message packets and determines whether the incoming SS7 message packets require processing by an internal subsystem or application or whether the incoming SS7 message packets are simply to be through switched. As a part of discrimination processing, discrimination function 366 may also perform gateway screening processing, thereby determining whether a received message is to be allowed into the SMG node for processing and/or routing. Messages that are permitted to enter the SMG node may be routed to other communications modules in the system or distributed to an application engine or processing module via IMT bus 306.

Network management function 372 transmits, receives, and maintains network management information associated with entities residing in networks with which SMG node 350 communicates. Network management function 372 generates and transmits network management messages, such as MTP network management messages, on behalf of one or more SMS gateway application subsystems associated with SMG node 350. Network management function 372 may communicate or distribute received network management information to other communications and processing modules, such as LIMs 108, DCMs 110, AEMs 352, and DSMs 112, associated with SMG 350. A similar network management function residing on DCMs within the system may likewise communicate received IP network management information received from IP network entities, such as an SMPP gateway node, to other communication and processing modules in the system.

Communication Module Functions in an SMG Node

In SS7-based mobile communications networks, SMS messages may be transported using the services of the signaling connection control part (SCCP), mobile application part (MAP), and transaction capabilities application part (TCAP) protocols. As such, in order to identify a received message that may require processing by a provisioned SMS gateway application subsystem or other internal subsystem application, discrimination function 366 may examine a service indicator octet (SIO) parameter in a received message packet. The SIO parameter includes is a service indicator (SI) value, which identifies the signaling protocol type of the message. An SI value of 3 indicates that a message is an SCCP message and therefore a potential MAP SMS-related message. Discrimination function 366 may also examine called party address information contained in a received SCCP message. Such called party address information may include a subsystem indicator field, a point code indicator field, a global title indicator field, and a routing indicator field.

In the event that the routing indicator field value identifies the message as one to be routed using the specified point code (PC) and subsystem (SSN) address information, discrimination function 366 determines whether the specified destination PC and SSN refer to an application subsystem associated with SMG node 350. Examples of application subsystems that may be associated with SMG node 350 include a short message gateway subsystem, a global title translation subsystem, or other subsystem associated with SMG node 350. If the specified destination PC and SSN are associated with an SMS gateway application subsystem associated with SMG node 350, then discrimination function 366 passes the message to distribution function 370, which in turn transmits the message to short message gateway application engine module 352 via IMT bus 306. For load sharing purposes, more than one SMS gateway application engine module may be simultaneously provisioned in SMG node 350. In such an embodiment, distribution function 370 may select a particular application engine module based on load-sharing considerations, application engine module status, or information contained in a received SMS message, such as the message originator, message recipient, originating network, recipient network, or quality of service requirements.

If the routing indicator field value included in the message identifies the message as requiring global title translation (GTT), discrimination function 366 passes the message to distribution function 370, which in turn transmits the message to a GTT processing module, such as a GTT-equipped DSM, via IMT bus 306. In one embodiment, short message gateway and GTT processing functionality may be included on the same application engine processing module, such as DSM 312. In any event, once GTT processing has been performed, a check similar to that described above is again performed by the GTT processing module in order to determine whether the post-GTT destination PC and SSN refer to a short message gateway application subsystem associated with the SMG node. If the specified destination PC and SSN are associated with a short message gateway application subsystem associated with SMG node 350, then the message is communicated from the GTT processing module to a short message gateway application engine module.

Figure 6:
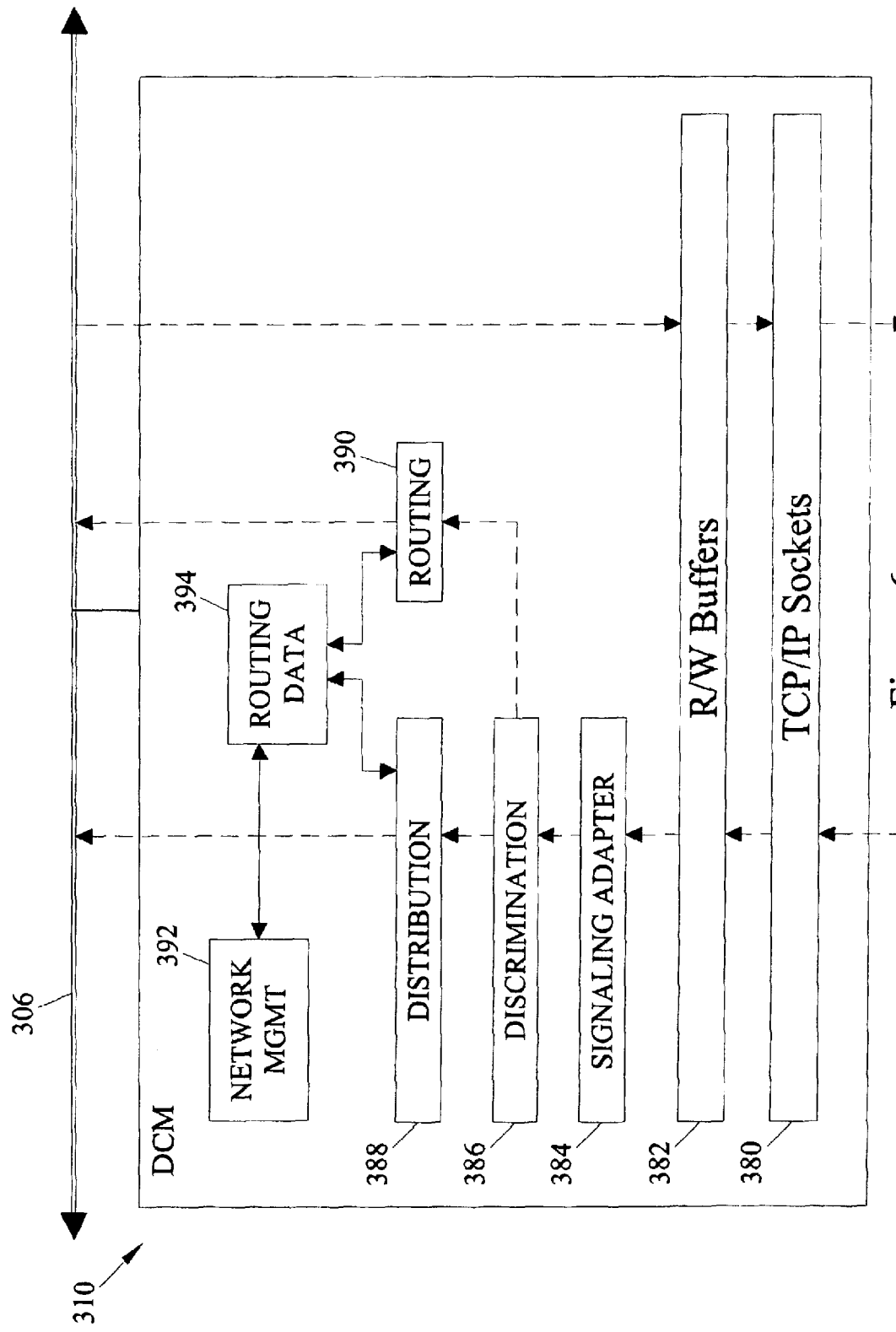
FIG. 6 is a block diagram of a Internet protocol capable data communication module (DCM) suitable for use in a short message gateway node according to an embodiment of the present invention.

FIG. 6 is a functional block diagram of a DCM communication module 310 that transmits and receives message packets via one or more TCP/IP sockets. DCM module 310 includes a TCP/IP sockets layer 380, a TCP/IP sockets read/write buffer 382, a signaling adapter layer 384, a discrimination function 386, a distribution function 388, a routing function 390, a network management function 392, and a routing information data structure 394. TCP/IP sockets layer 380 may perform Open System Integration (OSI) transport layer functions, such as reliable transfer of messages over the underlying unreliable network. Although not illustrated in FIG. 6, DCM 310 may also include a network layer for performing IP forwarding and maintaining IP routing protocols, a datalink layer for performing layer 2 error detection and correction, and a physical layer for sending and receiving electrical or optical signals over an electrical or optical communications medium.

TCP/IP read/write buffer 382 temporarily buffers inbound and outbound packets. Signaling adapter layer 384 performs functions for sending and receiving SS7 signaling messages over an IP network. Packet discrimination function 386 prevents unauthorized messages from entering the SMG node and determines whether a received message is destined for a provisioned application subsystem of SMG node 350. If a message is destined for a provisioned application subsystem, such as a short message gateway application, discrimination function 386 passes the message to distribution function 388. If a message is destined for an external node, discrimination function 386 may pass the message to routing function 390.

Distribution function 388 may resolve the destination address associated with the received message to an internal address associated with an available short message gateway application engine module. Distribution function 388 may select a particular application engine module based on load-sharing considerations, application engine module status, or information contained in a received SMPP message, such as the message originator, the message recipient, the originating network, the recipient network, or quality of service requirements. Routing function 390 may route messages to communications modules within SMG 350 associated with outbound signaling links using routing data stored in routing tables 394.

Network management function 392 may transmit, receive, and maintain network management information associated with entities, such as SMPP gateways, residing in IP networks with which SMG node 350 is communicating. Network management function 392 may generate and transmit network management messages on behalf of one or more SMS gateway application subsystems associated with SMG node 350. Network management function 392 may also communicate or distribute received network management information to other communications and processing modules, such as LIM, DCM, AEM, and DSM modules, associated with SMG node 350.

DSM or AEM Architecture

Figure 7:
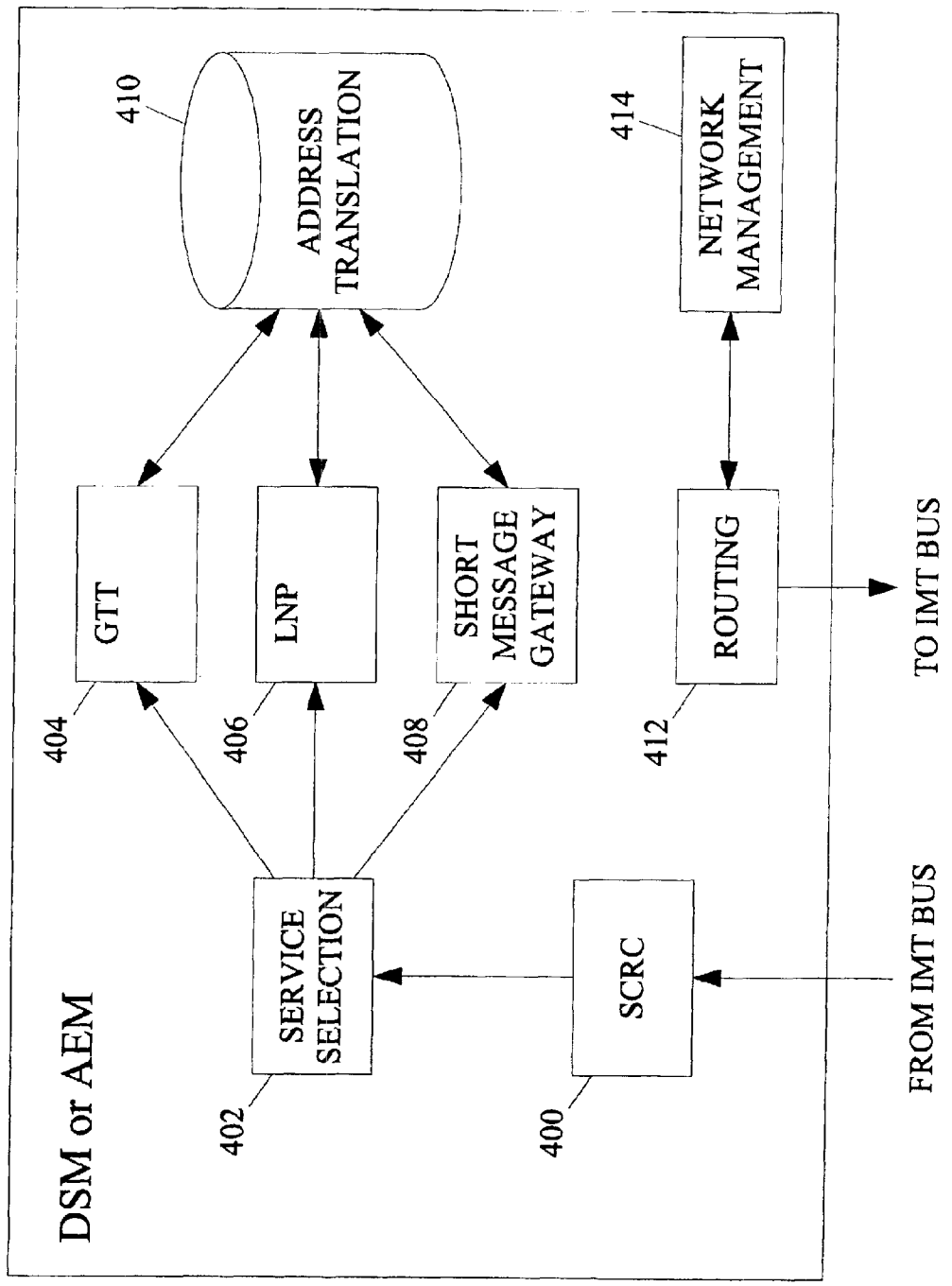
FIG. 7 illustrates an exemplary internal architecture for a database services module or an application engine module suitable for supporting a short message gateway application according to an embodiment of the present invention.

FIG. 7 illustrates an exemplary internal architecture for a DSM or AEM suitable for supporting short message gateway functionality according to an embodiment of the present invention. Referring to FIG. 7, an exemplary DSM or AEM may include a signaling connection routing controller (SCRC) 400. Signaling connection routing controller 400 controls the overall processing of SCCP messages. For example, signaling connection routing controller 400 may include or call a service selection function 402 to select the particular service to be provided for an SCCP message. Service selection function 402 may analyze one or more parameters in a message to determine the appropriate type of service required. For example, for SCCP messages, service selection function 402 may examine the translation type, nature of address indicator, numbering plan, domain, or other SCCP, TCAP, or MAP parameters to select a service to be provided for a message. According to an important aspect of the present invention, service selection function 402 preferably identifies MAP messages requiring short message gateway processing. Exemplary parameters that may be used to identify MAP messages for short message gateway processing include the TCAP opcode and the MAP message type.

GTT function 404 performs global title translation on received SCCP messages that service selection function 402 identifies as requiring global title translation. LNP function 406 performs number portability translation for messages that service selection function 402 identifies as requiring number portability translation. Short message gateway function 408 receives messages that service selection function 402 identifies as requiring short message gateway processing, generates SMPP messages based on received SS7-based SMS messages, and determines destination SMPP addresses for the SMPP messages. These functions will be described in more detail below. Functions 404, 406, and 408 may access address translation data 410, which is preferably stored in local memory on a DSM or AEM. Storing the address translation data in local memory increases the speed at which address translation can be performed and reduces the number of messages required in the network to perform address translation. Finally, the exemplary DSM or AEM illustrated in FIG. 7 includes a routing function 412 and a network management function 414. Routing function 412 and network management 414 may perform SS7 MTP routing similar to the correspondingly-named functions on LIM 408.

Short Message Gateway Function

Figure 8:
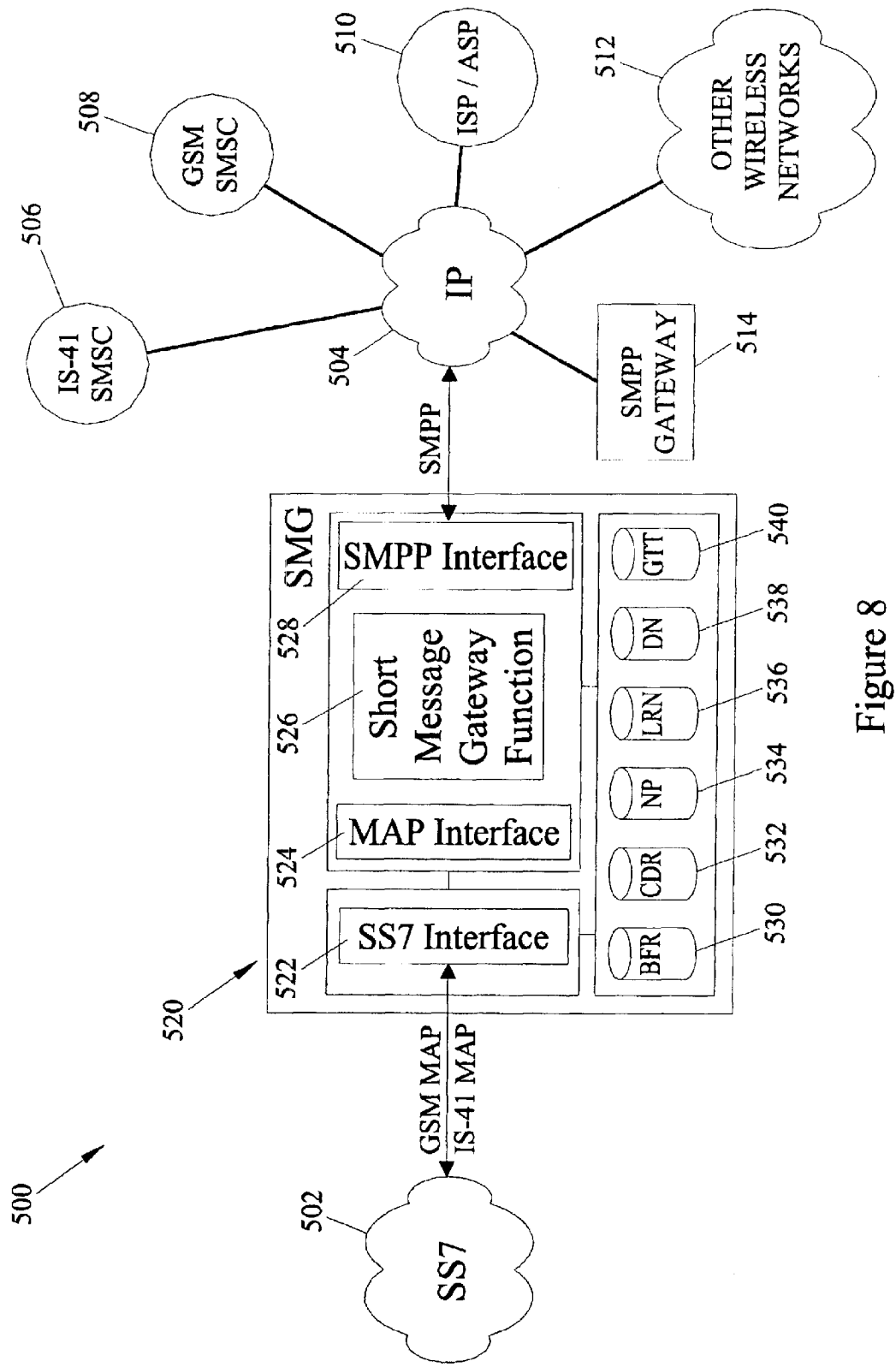
FIG. 8 is a block diagram illustrating an exemplary functional architecture for a short message gateway node according to an embodiment of the present invention.

FIG. 8 illustrates a communications network environment 500, which includes an SS7 signaling network 502, an IP network 504, an IS-41 SMSC node 506, a GSM SMSC node 508, an ISP/ASP 510, other wireless networks 512, and an SMPP gateway node 514. An SMG node 520 is coupled to both the SS7 and IP networks. SMG node 520 may include an underlying hardware architecture similar to any of the embodiments described above. However, in FIG. 8, the architecture of SMG node 520 is shown at the functional level. Such an architecture may be implemented on any suitable general purpose computing platform and is not limited to the platforms described above.

In FIG. 8, SMG node 520 includes an SS7 interface 522, a MAP interface 524, a short message gateway function 526, an SMPP interface 528, and a plurality of databases and database applications. More particularly, SMG node 520 includes an SMS message buffer database 530, a call detail record (CDR)/usage measurements and billing (UMB) database 532, a number portability (NP) database 534 containing NPA-NXX dialed number (DN)-to-LRN mapping information, an LRN directory database 536 containing LRN-to-IP address mapping information, and an NPA-NXX DN directory database 538 containing DN-to-IP address mapping information. As discussed above, a global title translation database 540 may also be included within or may be accessible by SMG node 520 in order to process received SCCP messages that require GTT.

SS7 interface 522 may include one or more SS7 LIMs. With particular regard to SMG node operation, it should be noted that SS7 interface 522 may receive, transmit, and process SMS-related messages associated with both IS-41 and GSM protocol mobile networks. Examples of such messages include GSM MO_Forward_SM messages and IS-41 SMS_Request messages.

Figure 9:
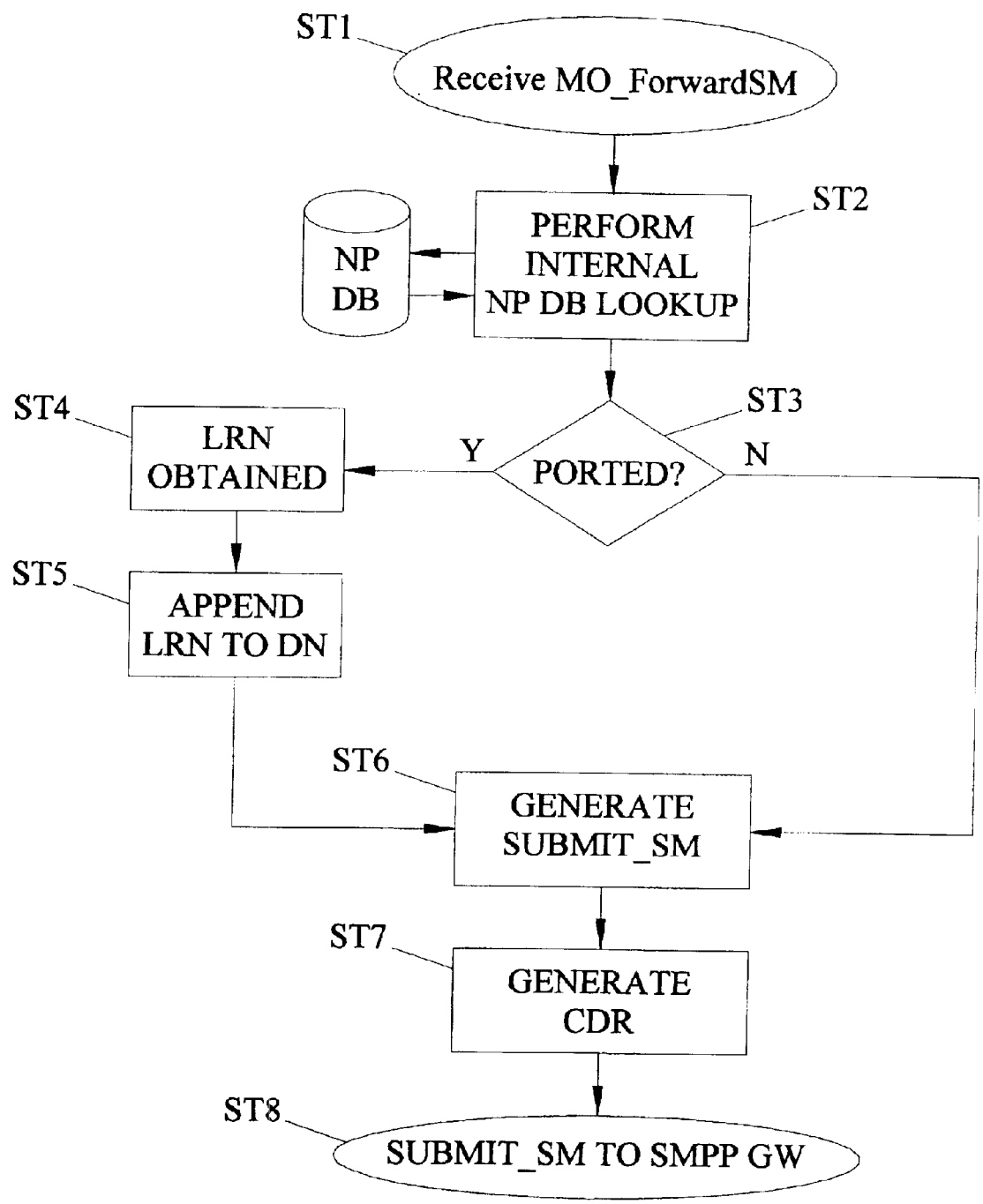
FIG. 9 is a flow chart illustrating exemplary message processing performed by a short message gateway node according to an embodiment of the present invention.

FIG. 9 is a flow chart, which may be used in conjunction with FIG. 8 and the following example to illustrate the operation of an SMG node according to an embodiment of the present invention. The processing steps illustrated in FIG. 9 assume that SMG 520 has LNP translation functionality but not LRN and DN address translation functionality. In this example, the LRN and DN translation databases are assumed to be present or accessible by an SMPP gateway.

Referring to FIG. 9, in step ST1, a GSM MAP MO_Forward_SM message is received by an SS7 interface of an SMG node. In this example the message is assumed to be addressed to a point code and subsystem associated with an short message gateway application associated with SMG node 520. The received SMS message may require global title translation prior to short message gateway service selection. In such a case, GTT processing would first be performed, and the SMS message would subsequently be directed to short message gateway function 526. In any event, the SMS message is directed to a short message gateway application engine module, which includes MAP interface 524. Other SS7 MAP messages, which are not addressed (directly or via GTT) to the short message gateway application subsystem, may be processed by the appropriate MAP service and either terminated or routed to there intended destinations. For SMG processing, MAP interface 524 may extract relevant information from an SMS protocol data unit including the sender mobile station address, the destination mobile station address, and the SMS payload. In North America, mobile station addresses typically conform to the North American numbering plan (NANP), which is NPA-NXX-XXXX. As with the SS7 interface, the MAP interface may also recognize and extract information from both GSM and IS-41 based SMS PDUs. In both cases, MAP interface 524 may terminate the received MAP SMS message, which may be an IS-41 SMS_Request message or a GSM MO_Forward_SM message, and provide the sending mobile switching center with a successful TCAP Return_Result_Last, in order to acknowledge that the SMS message has been accepted by SMG node 520.

Once the received MAP SMS message has been decoded by MAP interface 524, the decoded message contents are passed to short message gateway function 526. As a result of number pooling and mobile number portability, intermediate database lookups, including a lookup in number portability database 534, may be performed before the SMS message can be delivered to an SMPP gateway. In one embodiment, short message gateway function 526 may query integrated NP database 534 in order to determine if the destination mobile station address is ported, as indicated in step ST2. The destination mobile station identifier extracted from the message may be used as the search key for this number portability query. If the number is ported (ST3), the response to the number portability query will contain an LRN (ST4). If the number is not ported, the response to the number portability query will contain the original NPA-NXX destination mobile station address. If the destination mobile station address is ported, the returned LRN value is appended to the mobile station address DN value (ST5).

Short message gateway function 526 may generate an SMPP Submit_SM message, which is equivalent to or associated with the received MAP SMS message (ST6). The concatenated LRN+DN information is included in the SMPP Submit_SM message, which is then addressed to the IP address of serving SMPP gateway entity 110. In one embodiment of the present invention, a call detail record (CDR) may be generated by short message gateway function 526 and stored in CDR database 532 (ST7). The CDR generated may include the original received MAP SMS message, the TCAP Return_Result_Last acknowledgement message, the SMPP Submit_SM message, and any associated error messages. The CDR may include some or all of the information contained in these messages. Table 1 shown below illustrates exemplary CDR data that may be stored in CDR/UMB database 532.

TABLE 1

CDR Information

CDR RECORD DATA

| Date | Time | SMS Recipient | SMS Source | Carrier | Destination IP Address |
|---|---|---|---|---|---|
| Dec. 01, 2000 | 13:01:24 | 9194691300 | 9194671100 | 221 | 10.10.10.1 |
| Dec. 01, 2000 | 13:01:24 | 9193457012 | 9194621450 | 636 | 10.10.10.1 |
| Dec. 01, 2000 | 13:01:24 | 9193457894 | 914671230 | 221 | 10.10.10.1 |

The sample CDR data in Table 1 includes date and timestamp information, a destination mobile station/subscriber identifier field that contains the directory number or other identifier, such as an IP address or an email address, associated with the SMS receiving party, an originating mobile station/subscriber identifier field that contains the directory number or other identifier, such as an IP address or an email address, associated with the SMS sending party, a carrier ID field that contains the carrier ID associated with an SMS message, and a destination entity ID, such as an IP address. In the case of transactions involving a ported subscriber, LRN information may be appended to the source or recipient party address information stored in a CDR. UMB database 532 may also collect and maintain peg count type usage measurements and statistics associated with processed SMS messages.

In any event, barring a processing error, the resulting SMPP Submit_SM message is transmitted to the destination IP address (ST8) via SMPP interface 528. In one embodiment of the present invention, SMPP interface 528 includes a DCM that provides IP connectivity to the serving SMPP gateway entity associated with the destination IP address. That is, one or more SMPP transceiver-type (bi-directional communication) sessions may be established and maintained with the assistance of a DCM. Furthermore, in certain signaling scenarios, SMPP interface 528 may establish SMPP sessions with both an SMPP gateway entity and an SMSC node. This case will be described in more detail below.

Figure 10:
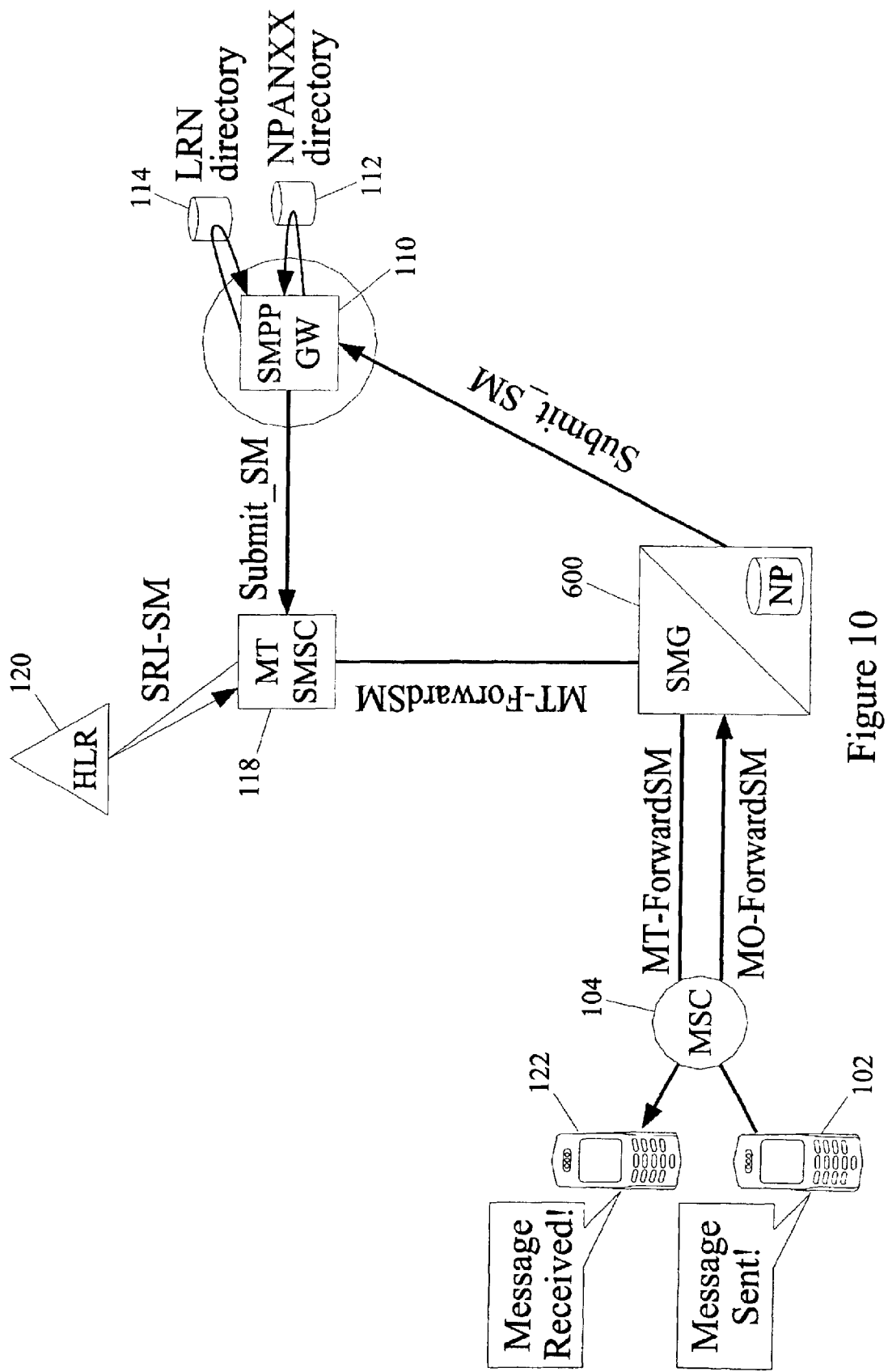
FIG. 10 is a network diagram illustrating an exemplary SMS message flow associated with the flow chart illustrated in FIG. 9.

FIG. 10 is a message flow diagram illustrating SMS messaging corresponding to the flow chart in FIG. 9. In FIG. 10, SMPP gateway entity 110 may receive the Submit_SM message formulated by SMG 600 using the steps illustrated in FIG. 9 and determine the next routing "hop," where the next hop may be an IS-41 network entity, a GSM network entity, an ISP, an ASP, an SMPP entity, or an entity residing in another communications network, such as a general packet radio service network, an 802.11x network, or comparable wireless data network. SMPP gateway 110 may utilize an NPA-NXX directory database 112 or an LRN directory database 114 when determining a destination for the Submit_SM message. An LRN directory database contains LRN-to-serving MT-SMSC IP address mapping information, and an NPA-NXX DN directory database contains DN-to-serving MT-SMSC IP address mapping information. In the example shown in FIG. 10, the SMS message recipient is another mobile subscriber (i.e., mobile station 122) served by terminating GSM SMSC node 118. As such, SMPP gateway 110 accesses LRN directory database 114 using the LRN+DN information contained in the received Submit_SM message and obtains the IP address associated with an SMPP interface in MT-SMSC node 118. SMPP gateway 110 then routes the Submit_SM message to MT-SMSC node 118. MT-SMSC 118 receives the Submit_SM message and queries HLR 120 for status and location information associated with intended recipient mobile subscriber 122 using a GSM MAP send_routing_information_for_short_message (SRI_SM) message. HLR 120 responds to MT-SMSC 118 with recipient mobile subscriber status and location information, such as the serving MSC ID. If intended recipient mobile subscriber 122 is unavailable, MT-SMSC 118 may temporarily buffer the SMS message and attempt delivery when the subscriber becomes available. If mobile subscriber 122 is available, MT-SMSC 118 may translate the SMPP Submit_SM message into an equivalent GSM MAP MT_ForwardSM message and transmit the MT_ForwardSM message to MSC 104 via SMG 600. SMG 600 routes the MT_ForwardSM message to MSC 104. MSC 104 in turn delivers the SMS message to the intended recipient.

Figure 1:
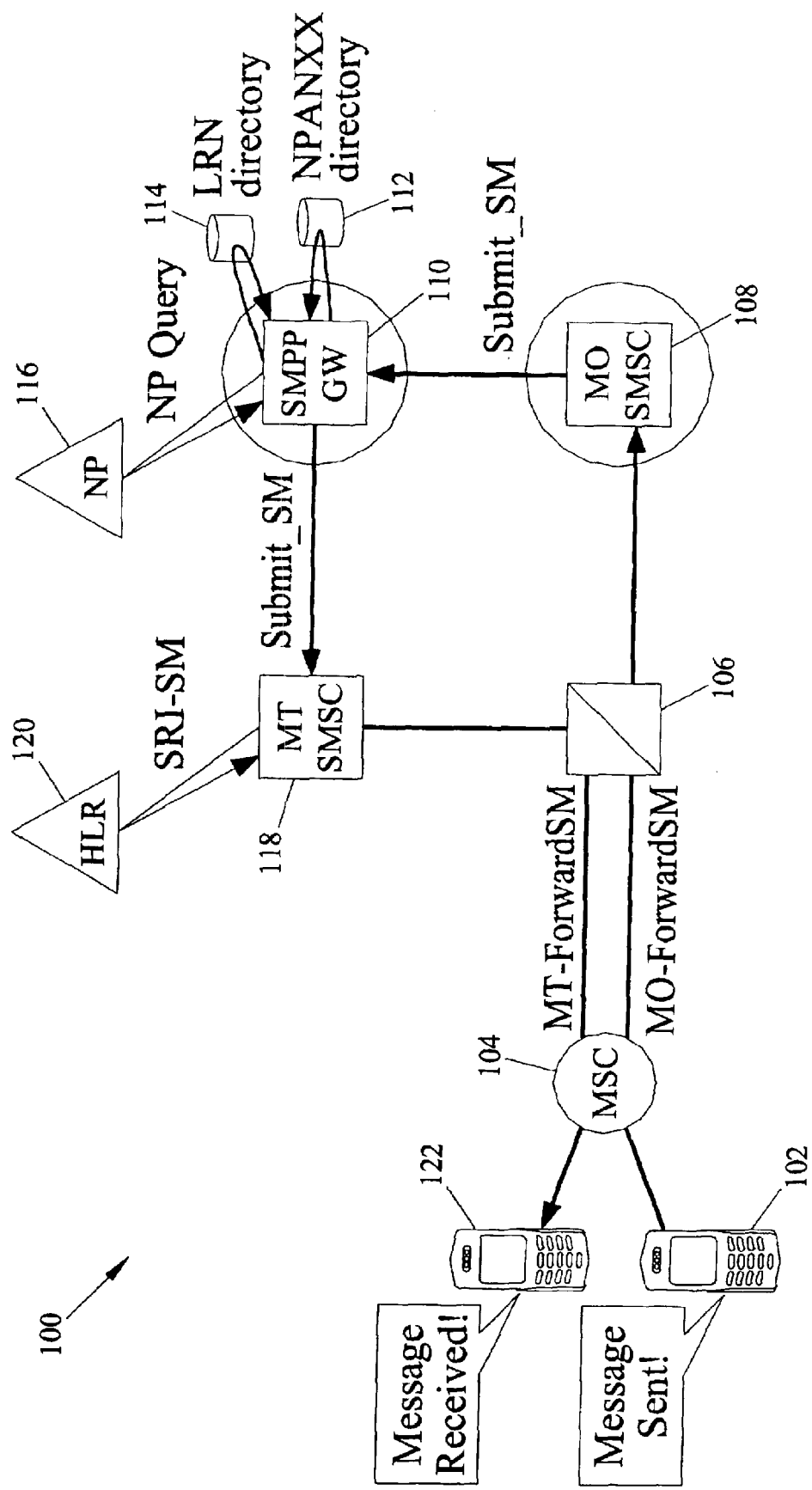
FIG. 1 is a network diagram illustrating a conventional short message service delivery scenario.

As compared with the conventional SMS delivery process illustrated in FIG. 1, SMG node 600 deployed as illustrated in FIG. 10 eliminates the need for MO-SMSC and NP database nodes 108 and 116. From a network administration and operations perspective, this reduction in the number of network entities required to deliver an SMS message is a significant advantage over conventional SMS delivery solutions. In addition, because SMG node 600 may also be an STP and/or an SS7/IP gateway, the number of nodes required to deliver SMS and other types of messages is further reduced.

SMG Node With Integrated LRN and DN Directory Databases

Figure 11:
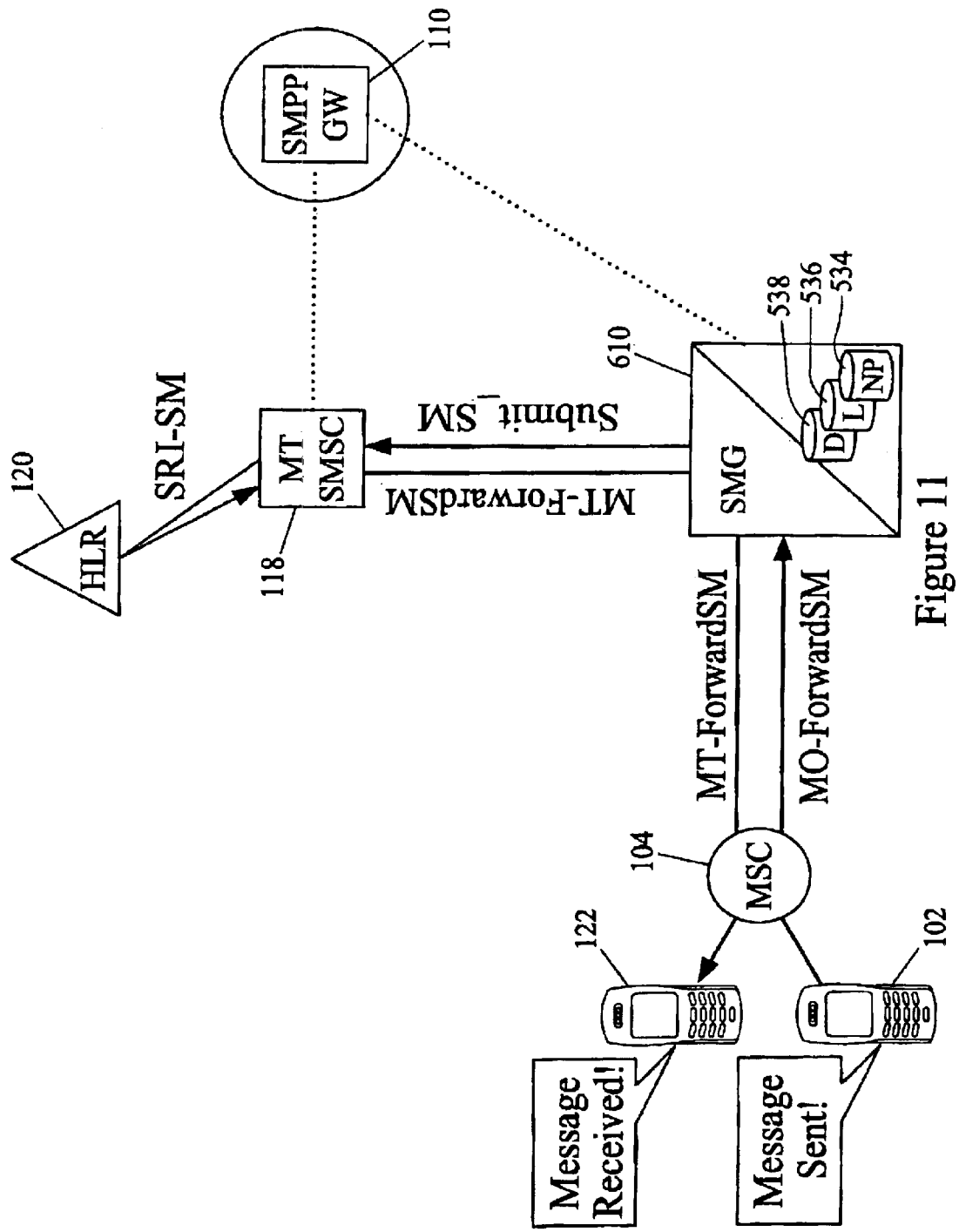
FIG. 11 is a network diagram illustrating an exemplary SMS message flow associated with a short message gateway node according to an alternate embodiment of the present invention.

FIG. 11 illustrates an SMG node 610 that communicates via an SMPP interface with both an SMPP gateway entity and one or more MT-SMSC nodes. In FIG. 11, SMG node 610 may generate and route SMPP Submit_SM messages directly to a serving MT-SMSC node in a mobile communications network if it is determined that a received MAP SMS message is intended for a recipient who is served by an MT-SMSC accessible by SMG node 610 via the SMPP interface. In the event that a received MAP SMS message is intended for a recipient served by an MT-SMSC node that is not accessible to SMG node 610 via the SMPP interface, or, if the intended recipient is located in a foreign communications network, SMG node 610 may generate and route an SMPP Submit_SM message to a serving SMPP gateway entity via the SMPP interface.

The above-mentioned routing resolution functionality may be provided by including LRN and DN directory databases, 536 and 538 in SMG node 610. The network environment illustrated in FIG. 11 is similar to the environment described above with respect to FIG. 10, with the exception of SMPP gateway 110. More particularly, in the network environment illustrated in FIG. 11, SMPP gateway 110 does not include or have access to LRN and DN directory databases, and, as such, cannot perform the address resolution processing necessary to route SMS messages to terminating SMSC nodes in the mobile communication network. Once again, in this embodiment, SMG node 610 includes LRN and DN directory databases 536 and 538. As a result, SMG node 610 may identify SMS messages destined for an MT-SMSC, which are then communicated to the MT-SMSC node via the SMPP interface of SMG node 610 without involving an SMPP gateway entity.

Figure 12:
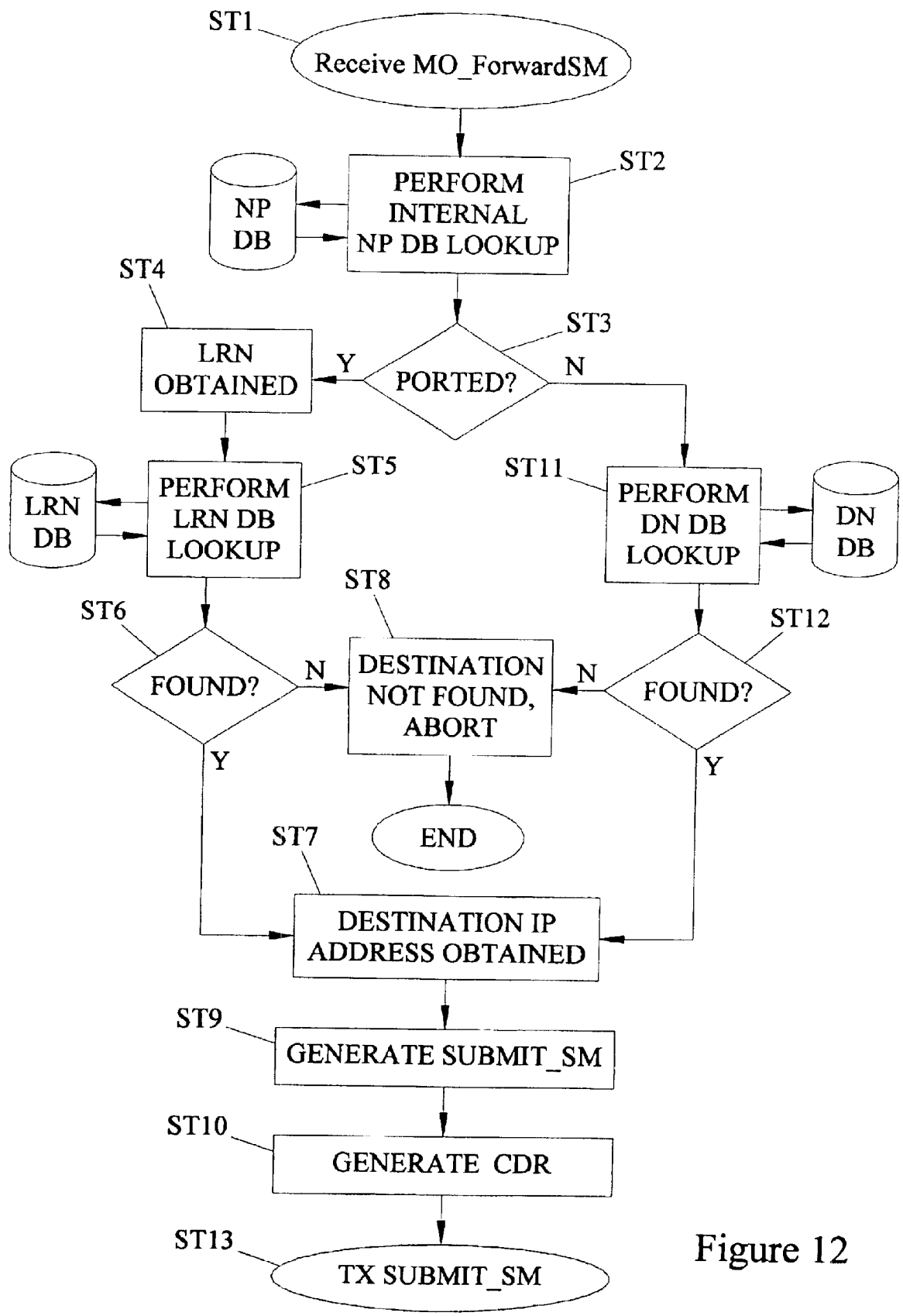
FIG. 12 is a flow chart illustrating exemplary message processing associated with the message flow illustrated in FIG. 11.

FIG. 12 is a flow chart illustrating exemplary message processing at SMG node 610. Referring to FIG. 12, in step ST1, a GSM MAP MO_Forward_SM message is received by an SS7 LIM of SMG node 610. In this example, it is assumed that the message is addressed to a point code and subsystem number associated with an SMS gateway function provisioned within SMG node 610. The received SMS message may be addressed in such a manner so as to require global title translation prior to short message gateway processing. In such a case, GTT processing would first be performed, and the SMS message would subsequently be directed to the short message gateway function. In any event, the SMS message is directed to a short message gateway application engine module, which includes the MAP interface 524, as illustrated in FIG. 8. Other SS7 MAP messages that are not addressed (directly or via GTT) to the SMS gateway application subsystem may be processed by the appropriate MAP service and either terminated or routed to their intended destinations. For short message gateway service, MAP interface 524 may extract relevant information from an SMS protocol data unit (PDU) including the sender mobile station address, the destination mobile station address, and the SMS payload. As with the SS7 interface, the MAP interface may also recognize and extract required information from both GSM and IS-41 based SMS PDUs. In both cases, MAP interface 524 may terminate the received MAP SMS message, such as an IS-41 SMS_Request message or a GSM MO_Forward_SM message, and provide the sending mobile switching center with a successful TCAP return_result_last, in order to acknowledge that the SMS message has been accepted by SMG node 610.

Once the received MAP SMS message has been decoded by MAP interface 524, the decoded message contents are passed to SMS gateway function 526. Using the destination mobile station address, a routing resolution procedure is performed by short message gateway function 526. The routing resolution procedure maps the NPA-NXX destination mobile address to the IP address of either a terminating SMSC or an SMPP gateway entity. However, as a result of number pooling and mobile number portability, the routing resolution procedure may require a number of intermediate database lookups, including a lookup in number portability database 534. In one embodiment, short message gateway function 526 may formulate and launch an internal number portability query to integrated NP database 534 in order to determine if the destination mobile station address is ported, as indicated in step ST2. The extracted destination mobile station address is used as the search key for this number portability query. If the number is ported (ST3), the response to the number portability query will contain a LRN (ST4). If the number is not ported, the response to the number portability query will contain the original NPA-NXX destination mobile station address.

Assuming that the mobile station address has been ported, and an LRN value was returned, internal LRN database 536 is accessed using the LRN value (ST5). If a matching entry is located in LRN database 436 (ST6), a destination IP address associated with either a terminating SMSC or a serving SMPP gateway entity is returned (ST7). Failure to locate a matching entry in LRN database 536 results in a processing error (ST8). If a match is located and a destination IP address determined, short message gateway function 526 may generate an SMPP Submit_SM message equivalent to or based on the received MAP SMS message (ST9), which is then addressed to the destination IP address returned from the LRN database lookup. As discussed above, a CDR may be generated by short message gateway function 526 and stored in CDR database 532 (ST10). The CDR may include the original received MAP SMS message, the TCAP return_result_last acknowledgement message, the SMPP Submit_SM message, and any error messages. The CDR may include some or all of the information contained in these messages.

For a non-ported number, that is, a number for which no matching entry is located in the NP database, internal DN database 538 is accessed using the mobile station address NPA-NXX value (ST11). If a matching entry is located in DN database 538 (ST12), a destination IP address associated with a terminating SMSC or serving SMPP gateway entity is returned (ST7). Failure to locate a matching entry in the DN database 536 results in a processing error (ST8). If a match is located, and a destination IP address is determined, short message gateway function 526 may generate an SMPP Submit_SM message, which is equivalent to or based on the received MAP SMS message (ST9). The mobile station identifier information is included in the SMPP Submit_SM message, which is then addressed to the destination IP address returned from the DN database lookup. In any event, barring a processing error, the resulting SMPP Submit_SM message is transmitted to the destination IP address (ST13) via SMPP interface 528.

In the SMS signaling scenario described with respect to FIG. 11, MAP SMS signaling messages from an MSC are received by an SMG from in a mobile communications network. In this case, address resolution processing is performed (i.e., the IP address of the destination SMPP interface is determined), MAP SMS-to-SMPP message translation is performed, and the resulting SMPP message is transmitted via an SMPP interface. However, an SMG node may perform similar gateway processing for SMPP Submit_SM messages received from an SMPP gateway node. In the case of a received SMPP Submit_SM message, routing address resolution processing, such as NP, LRN, or DN database processing, is performed in a manner similar to that described above. That is, SMG 610 may perform the NP, LRN, and/or DN translations for a received Submit_SM message and route the Submit_SM message to the MT SMSC. In such SMPP-only signaling scenarios, MAP SMS-to-SMPP message translation processing is not required to be performed by the SMS gateway function. However, in such SMPP-only scenarios, the SMG eliminates queries and responses to external NP databases and also eliminates the need for stand-alone SMPP gateways.

In the case of congestion or failure of a destination SMPP entity, such as an SMPP gateway or an MT-SMSC, an SMG of the present invention may temporarily buffer SMPP Submit_SM or MAP SMS (GSM & IS-41) message information in an SMS buffer database, such as buffering database 530 described above with respect to FIG. 8. In the case that a message is buffered, normal SMS gateway processing is resumed with regard to the buffered message once the congestion or failure condition has been resolved. The need for temporary buffering, the duration of buffering, and the amount of buffering database resources required may be included in a CDR associated with a received SMS message. This information may be used to bill a network operator or service provider.

Thus, the present invention includes a short message gateway that performs some or all of the functions required to interface between SS7 network entities, such as mobile switching centers, and SMPP network entities, such as short message service centers and SMPP gateways. In one embodiment, the short message gateway includes an SS7 interface, an SMPP interface, and a number portability database. In another embodiment, the short message gateway includes an SS7 interface, an SMPP interface, a number portability database, an LRN database, and a DN database. In addition to SMPP conversion functionality, a short message gateway may include traditional STP functionality. By performing functions conventionally performed by multiple service centers and database nodes, a short message gateway of the present invention reduces the amount of hardware and signaling traffic required to deliver SMS messages.

In addition to providing routing address translation data, a number portability database, such as database 536, may be used for message authentication. For example, database 536 may contain lists or ranges of calling or sending party numbers for subscribers who are authorized to access MT-SMSC 118. If a calling or sending party number in a received MO_ForwardSM or Submit_SM message is not in the list, the message may be discarded. If a calling or sending party number is in the list, the message may be processed using the steps described above.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for communicating a short message payload to a destination, the method comprising:
   (a) receiving an SS7-based short message service (SMS) message at a short message gateway node, the SMS message including a destination mobile subscriber address and a short message payload;
   (b) using the destination mobile subscriber address to perform a number portability (NP) translation using an NP database in the short message gateway node and obtaining a location routing number responsive to the mobile subscriber being ported;
   (c) generating, at the short message gateway node, a short message point-to-point (SMPP) message based on the SMS message, the SMPP message including the destination mobile subscriber address, the LRN, and the short message payload; and
   (d) transmitting the SMPP message from the short message gateway node to an SMPP gateway.

2. The method of claim 1 wherein receiving an SMS message includes receiving a Global System for Mobile Communications (GSM) mobile application part (MAP) MO_ForwardSM message.

3. The method of claim 1 wherein receiving an SMS message includes receiving a American National Standards Institute (ANSI) Interim Standard 41 (IS-41) MAP SMDPP_Request message.

4. The method of claim 1 wherein generating an SMPP message includes generating an SMPP Submit_SM message.

5. The method of claim 1 wherein transmitting an SMPP message includes transmitting the SMPP message via an SMPP-over-Internet protocol communication link.

6. The method of claim 1 including buffering SMS message information in the event that the SMPP gateway is congested or unable to receive messages.

7. The method of claim 1 including generating and storing usage measurements associated with SMS message processing.

8. The method of claim 7 wherein the usage measurements include peg count information.

9. The method of claim 7 wherein the usage measurements include temporary buffer resource usage information.

10. The method of claim 7 wherein generating and storing usage measurements includes generating and storing a call detail record (CDR).

11. The method of claim 7 including using the usage measurements to generate a bill.

12. A method for communicating a short message payload to a destination, the method comprising:

(a) receiving, at a short message gateway, an SS7-based short message service (SMS) message including a destination mobile subscriber address and a short message payload;

(b) using the destination mobile subscriber address to perform a number portability (NP) translation and obtaining location routing number (LRN) responsive to the mobile subscriber being ported;

(c) responsive to the mobile subscriber not being ported, determining a destination address for the short message payload using the destination mobile subscriber address and a destination mobile subscriber address-to-destination address translation database within the short message gateway;

(d) responsive to the mobile subscriber being ported, determining the destination address for the short message payload using the LRN and an LRN-to-destination address translation database within the short message gateway;

(e) generating, at the short message gateway, a short message point-to-point (SMPP) message based on the SS7 SMS message, the SMPP message including the short message payload; and (f) transmitting the SMPP message from the short message gateway to the destination address determined in step (c) or step (d).

13. The method of claim 12 wherein receiving an SS7-based SMS message includes receiving a Global System for Mobile Communications (GSM) mobile application part (MAP) MO_ForwardSM message.

14. The method of claim 12 wherein receiving an SS7-based SMS message includes receiving an American National Standards Institute (ANSI) Interim Standard 41 (IS-41) MAP SMDPP_Request message.

15. The method of claim 12 wherein using the destination mobile subscriber address to perform an NP translation includes accessing an NP database within the short message gateway.

16. The method of claim 12 wherein generating an SMPP message includes generating an SMPP Submit_SM message.

17. The method of claim 12 wherein transmitting the SMPP message includes transmitting the message via an SMPP-over-Internet protocol communication link.

18. The method of claim 12 wherein transmitting the SMPP message to the destination address includes transmitting the SMPP message to an SMPP gateway.

19. The method of claim 12 wherein transmitting the SMPP message to the destination address includes transmitting the SMPP message to a terminating short message service center (SMSC).

20. The method of claim 12 including buffering SMS message information responsive to an entity associated with destination address being congested or unable to receive messages.

21. The method of claim 12 including generating and storing usage measurements associated with processing of the SS7 SMS message.

22. The method of claim 21 wherein the usage measurements include peg count information.

23. The method of claim 21 wherein the usage measurements include buffer resource usage information.

24. The method of claim 21 wherein generating and storing usage measurements includes generating and storing a call detail record (CDR).

25. The method of claim 21 including using the usage measurements information to generate a bill.

26. A short message gateway (SMG) node comprising:

(a) a first communications module for receiving an SS7 short message service (SMS) message including a destination mobile subscriber address and a short message payload;

(b) an application engine module operatively associated with the first communications module for receiving the SMS message from the first communication module, generating a short message point-to-point (SMPP) message responsive to the SMS message, including the short message payload in the SMPP message, and performing routing address resolution processing to determine a destination address for the SMPP message;

(c) a database accessible by the application engine module, the database including information useable by the application engine module for performing the routing address resolution processing and determining the destination address for the SMPP message; and (d) a second communications module for transmitting the SMPP message to the destination address.

27. The short message gateway node of claim 26 wherein the first communications module comprises a signaling system 7 (SS7) link interface module (LIM) for communicating with a mobile communications network.

28. The short message gateway node of claim 26 wherein the first communications module is adapted to communicate with a Global System for Mobile Communications (GSM) network.

29. The short message gateway node of claim 26 wherein the first communications module is adapted to communicate with an Interim Standard (IS)-41 network.

30. The short message gateway node of claim 26 wherein the application engine module comprises a computing platform coupled to an internal communication bus within the SMG node.

31. The short message gateway node of claim 26 wherein the database comprises a number portability database for performing the routing address resolution processing.

32. The short message gateway node of claim 26 wherein the database comprises a number portability database for performing message authentication.

33. The short message gateway node of claim 26 wherein the database comprises a LRN-to-destination address mapping database accessible by the application engine module for determining destination addresses for SMPP messages intended for ported subscribers.

34. The short message gateway node of claim 33 wherein the LRN-to-destination address mapping database includes LRN-to-mobile terminated SMSC address mappings for sending the SMPP messages intended for the ported subscribers to mobile terminated SMSCs associated with the ported subscribers.

35. The short message gateway node of claim 26 wherein the database comprises a dialed number-to-destination address mapping database accessible by the application engine module for determining destination addresses for SMPP messages intended for non-ported subscribers.

36. The short message gateway node of claim 35 wherein the dialed number-to-destination address mapping database includes dialed number-to-destination mobile terminated SMSC address mappings for delivering the SMPP messages intended for non-ported subscribers to mobile terminated SMSCs associated with the non-ported subscribers.

37. The short message gateway node of claim 26 wherein the second communications module comprises an Internet protocol (IP) capable data communication module (DCM).

38. The short message gateway node of claim 26 including an output buffer for buffering outbound SMPP messages responsive to destinations for the SMPP messages being unavailable or unreachable.

39. The short message gateway node of claim 26 including a usage measurements database for collecting and storing information associated with SMS message processing.

40. The short message gateway node of claim 26 wherein the first communications module, the application engine module, and the second communications module are components of a signal transfer point.

41. A method for communicating a short message payload to a destination, the method comprising:

(a) receiving, at a short message gateway, an SMPP-based message including a destination mobile subscriber address and a short message payload;

(b) using the destination mobile subscriber address to perform a number portability (NP) translation and obtain a location routing number (LRN) responsive to the mobile subscriber being ported;

(c) responsive to the mobile subscriber not being ported, determining a destination address for the short message payload using the destination mobile subscriber address and a destination mobile subscriber address-to-destination address translation database within the short message gateway;

(d) responsive to the mobile subscriber being ported, determining a destination address for the short message payload using the LRN and an LRN-to-destination address translation database within the short message gateway; and (e) transmitting the SMPP message from the short message gateway to the destination address determined in step (c) or step (d).

42. The method of claim 41 where the SMPP-based message comprises an SMPP Submit_SM message.

* * * * *